US006202820B1

(12) United States Patent
Peinemann et al.

(10) Patent No.: US 6,202,820 B1
(45) Date of Patent: Mar. 20, 2001

(54) PRESSURE PLATE FOR A FRICTION CLUTCH

(75) Inventors: Bernd Peinemann, Niederwerrn; Andreas Orlamünder, Schweinfurt, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/422,474

(22) Filed: Oct. 21, 1999

(30) Foreign Application Priority Data

Oct. 21, 1998 (DE) ............................................. 198 48 585

(51) Int. Cl.[7] ..................................................... F16D 13/72
(52) U.S. Cl. .................................. 192/107 M; 192/70.14; 192/113.21
(58) Field of Search ........................... 192/70.12, 70.14, 192/107 M, 113.2, 113.21

(56) References Cited

U.S. PATENT DOCUMENTS

| 4,422,538 | * | 12/1983 | Krumm | 192/70.14 |
| 5,655,637 | * | 8/1997 | Hays | 192/70.14 |
| 5,901,826 | * | 5/1999 | Datta | 192/70.14 |

FOREIGN PATENT DOCUMENTS 85 12 194    3/1985  (DE) .

* cited by examiner

*Primary Examiner*—Richard M. Lorence
(74) *Attorney, Agent, or Firm*—Cohen, Pontani, Lieberman & Pavane

(57) ABSTRACT

A pressure plate for a friction clutch has a friction-surface region which can be pressed against a friction-lining arrangement of a clutch disk or the like. The pressure plate, in the friction-surface region, is formed at least partially from a first material which provides rapid dissipation of heat generated by friction, and in a body region which adjoins the friction-surface region, is formed from a second material which has a high heat absorption capacity for the heat dissipated from the friction-surface region.

48 Claims, 2 Drawing Sheets

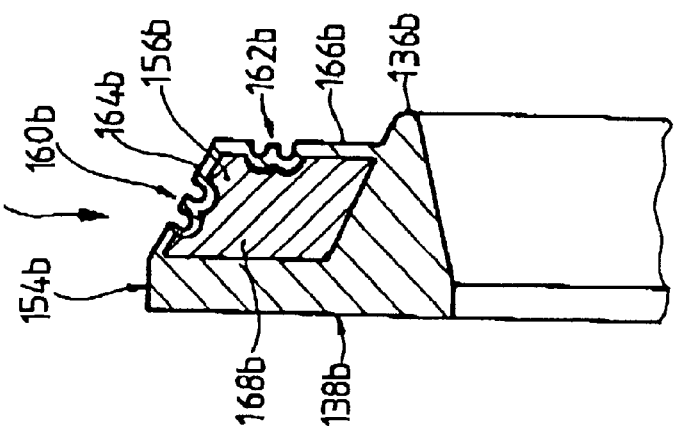
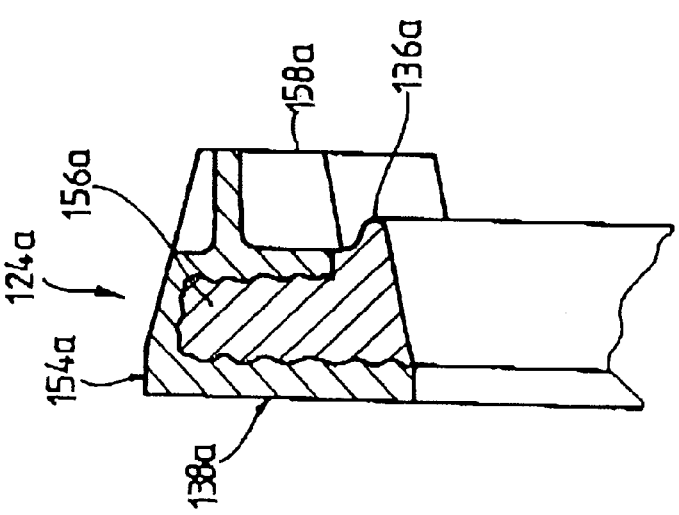
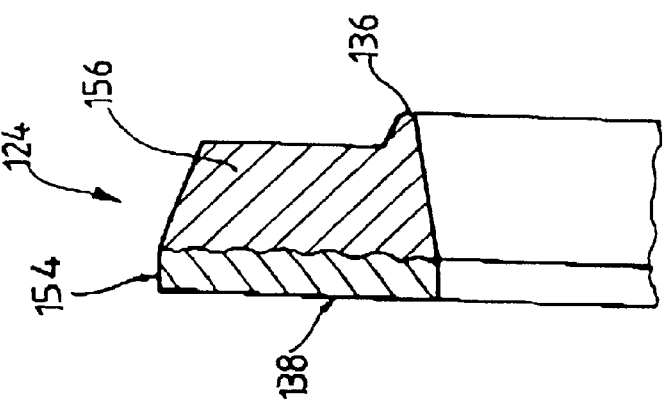

PRESSURE PLATE FOR A FRICTION CLUTCH

BACKGROUND OF THE INVENTION

1. Field of the Invention

The present invention relates to a pressure plate for a friction clutch, the pressure plate having a friction-surface region which can be pressed against a friction-lining arrangement of a clutch disk or the like.

2. Discussion of the Prior Art

A pressure plate of this nature is known, for example, from German reference DE 85 12 194 U1. When the clutch is being engaged and disengaged, pressure plates of this nature are moved onto or away from friction linings of the clutch disk by the action of an energy accumulator. During these movement states, there is slippage between the pressure plate and the friction linings, resulting in heating in the area of the friction lining and in the friction-surface region of the pressure plate.

Particularly where there is a tendency to increase the pressure force of such clutches, in order in this way to obtain increased clutch moments, there is also a tendency, when engaging and disengaging the clutch, for the thermal energy generated by the pressure plate and the friction linings rubbing against one another to increase, with the result that the temperature of the various components rises in this area. This may have a disadvantageous effect on the performance of the clutch, since the heat generated may cause various components to be deformed. There is also the risk in particular of reducing the service life of friction linings made from organic materials.

In order to counteract this problem, German reference DE 85 12 194 U1 proposes that a plurality of cooling ribs be arranged on the rear side of the pressure plate, in the form of a ventilator arrangement, so that intensified air circulation is produced in rotational mode, in order to allow the heat to be dissipated more successfully.

A further attempted solution consists in increasing the overall mass of the pressure plate or of the pressure-plate assembly, in order to be able to absorb the heat better. However, this entails increasing the size of the individual components, resulting in construction space problems and increased cost.

SUMMARY OF THE INVENTION

The object of the present invention is to provide a pressure plate for a friction clutch, by means of which it is possible to avoid effects which are induced by an increase in the temperature in the friction area.

In order to achieve this object, the present invention provides a pressure plate for a friction clutch, the pressure plate having a friction-surface region which can be pressed against a friction-lining arrangement of a clutch disk or the like.

The pressure plate according to the invention, in the friction-surface region, is at least partially formed from a first material which provides rapid dissipation of the heat generated by friction. In a body region which adjoins the friction-surface region, the pressure plate according to the invention is formed from a second material which has a high heat absorption capacity for the heat dissipated by the friction-surface region.

In the case of a pressure plate which is constructed in this way, therefore, it is ensured that the heat which is generated when the friction-surface region of the pressure plate comes into frictional engagement with a friction lining is rapidly conducted through the friction-surface region, so that there is no build-up of heat, resulting in an excessively high temperature, in the friction-surface region itself. This heat which is dissipated or conducted onward from the friction-surface region can then be absorbed in the body region and stored for a short time, since this region has a high heat absorption capacity. Since the operations of engaging and disengaging the clutch generally only take up short times, i.e. the generation of thermal energy or the conversion of kinetic energy into thermal energy will also only take place for a very limited time, it is possible, with an arrangement of this nature, to ensure that sufficient energy is dissipated from that region of the pressure plate which comes into contact with the friction linings. This energy, which is temporarily absorbed in the body region, can then be dissipated further outward from the body region.

In order to be able to maintain this removal of thermal energy from the region of the friction linings in a uniform manner, it is proposed for the first material to completely cover that surface region of the pressure plate which can be brought into contact with the friction-lining arrangement or the like.

To maintain the preceding function, it is proposed for the first material to comprise a material with a high thermal conductivity $\lambda$. In this case, it is advantageous if the thermal conductivity $\lambda$ of the first material lies in the range of at least 50 W/mK and higher. By way of example, the first material may comprise aluminum or copper or alloys thereof. This means that alloys which contain a material with good thermal conductivity are also able to achieve the effects described above.

Furthermore, it is advantageous if the second material comprises a material with the high specific heat capacity $c$. This specific heat capacity $c$ of the second material may be in the range of 0.35 kJ/kg K and higher. By way of example, this second material may comprise gray cast iron or steel.

The capacity to absorb and temporarily store heat which is dissipated from the friction-surface region in the body region, i.e. in the region of the second material, can also be obtained by the second material having a melting point which lies in the range of temperatures which occur in the event of frictional engagement of the pressure plate on a friction-lining arrangement or the like. In an arrangement of this nature, therefore, when thermal energy is generated and dissipated into the body region, the second material is melted, so that at least some of the thermal energy which is conducted into the body region has to be employed for the phase transition and, should the case arise, a remaining amount of the thermal energy then leads to further heating of the melted material. When energy is no longer introduced, the second material solidifies again and, in the process, continuously emits the energy which was previously introduced.

By way of example, the melting point of the second material may lie in the range from 80° C. to 250° C. Recommended examples for the second material are sodium, tin or alloys thereof or non-metallic materials, such as for example salts.

In order to be able to avoid the occurrence of imbalance in the region of the pressure plate even in the molten state, it is proposed for the second material to be contained in at least one chamber provided on the pressure plate.

In this case, for example, the at least one chamber may be essentially completely surrounded by the first material. On the one hand, this allows the introduction of heat into the body region, i.e. into the second material, to take place as quickly as possible, due to the largest possible interfacial region between the two materials. On the other hand, this large interfacial region also has advantageous effects when energy is being emitted from the second material as it solidifies again. In particular, it is ensured that the second material is again adjoined by a layer through which the thermal energy produced during the solidification can rapidly be conducted away by the second material, so that in this case too there is no build-up of heat.

Since the volume of the second material will generally change during the phase transition from the solid phase to the liquid phase, it is proposed for the volume of the at least one chamber to be variable.

Even in an embodiment in which there is no phase transition of the second material, it is advantageous, for the removal of thermal energy from the body region, if a third material, which provides rapid dissipation of the heat stored in the second material, adjoins the body region on that side which is opposite to the friction-surface region and/or radially on the outside and/or radially on the inside.

By way of example, the third material may be the same as the first material.

In a configuration of this nature, the maximum possible stability is obtained if the region which adjoins the body region and is formed from the first and/or the third material is an integral material region. It is then possible to dispense with joining operations between the first and the third material region.

A further improved dissipation of thermal energy from the body region can be obtained if a cooling-rib arrangement is provided on the pressure plate, preferably in a region which is remote from the friction-surface region.

If the various materials of the pressure plate are optimized with regard to the above-described functions of rapid conduction and high storage capacity, the problem may arise that adequate wear resistance possibly cannot be ensured any longer on the surface of the friction-surface region, and this could result in excessively rapid abrasion or wear to the pressure plate. In order to counteract this problem, a wear-resistant material layer, preferably a friction lining, is provided on the surface of the friction-surface region.

The present invention furthermore relates to a pressure-plate assembly, in particular for a motor vehicle friction clutch, comprising a pressure plate as described above.

The structure described above with reference to a pressure plate may likewise be employed in a flywheel or a secondary mass of a two-mass flywheel.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 2 shows a partial longitudinal section through a pressure plate according to the invention, in a first embodiment;

FIG. 3 shows a view which corresponds to FIG. 2 of an alternative embodiment of the pressure plate according to the invention; and FIG. 4 shows a further alternative embodiment of a pressure plate according to the invention.

DETAILED DESCRIPTION OF THE PREFERRED EMBODIMENTS

Figure 1:
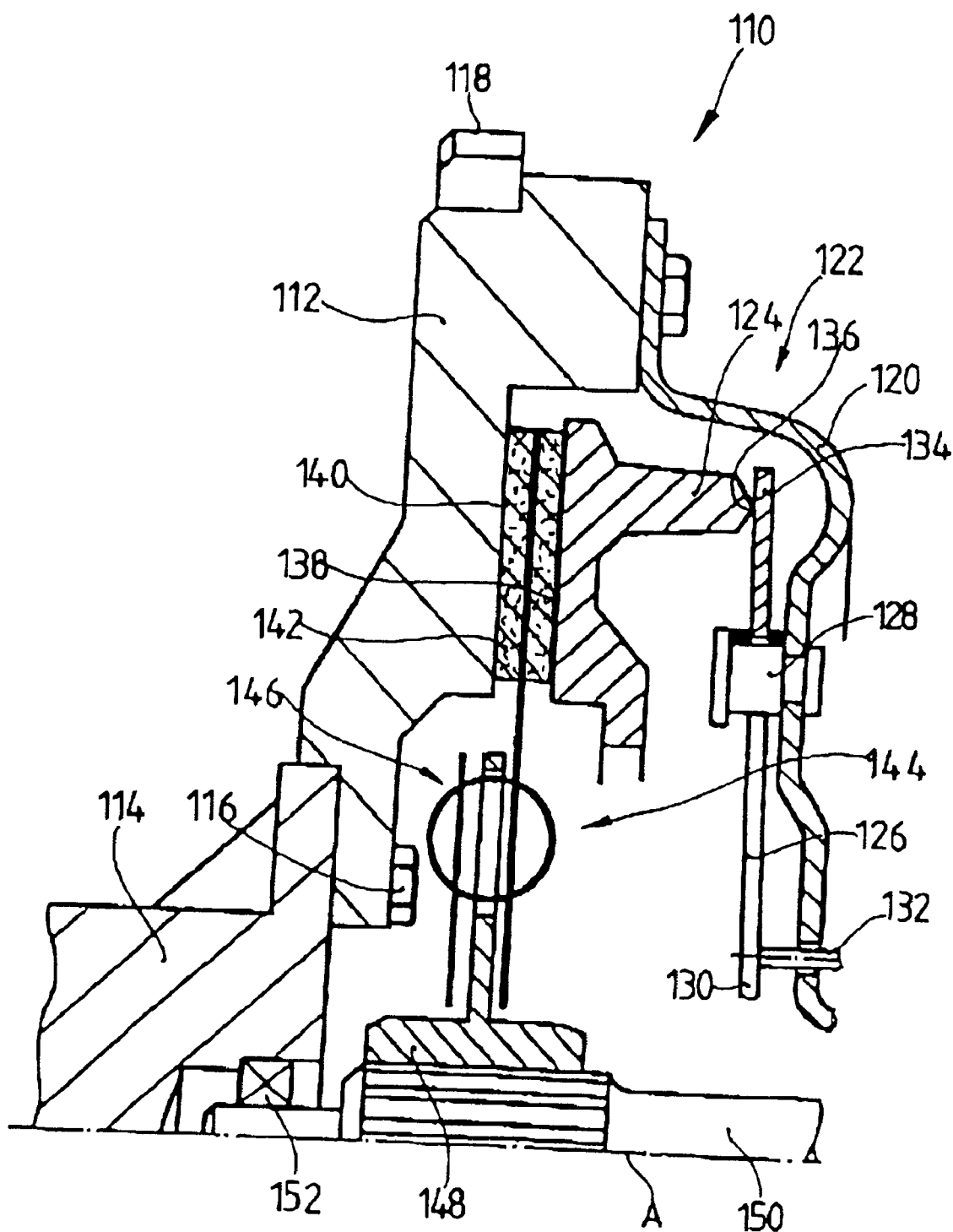
FIG. 1 shows a simplified partial longitudinal section through a motor vehicle friction clutch.

To begin with, the structure of a motor vehicle friction clutch is briefly described with reference to FIG. 1. The clutch 110 comprises a flywheel 112 which, in its radially inner region, is connected, in a rotationally fixed manner which is known per se, to a crankshaft 114 or another drive shaft, for example via threaded bolts 116 or the like. Radially on the outside, the flywheel 112 bears a starter ring gear 118 and a housing 120, which contains a clutch pressure-plate assembly which is denoted overall by 122 or forms a component of this assembly. A pressure plate 124 is held in the housing 120 in such a manner that it is rotationally fixed but can be displaced axially in the direction of an axis of rotation A. An energy accumulator, for example in the form of a diaphragm spring 126, is held on the housing 120 via spacer bolts 128 and, for disengagement purposes, can be pushed to the left, in the illustration shown in FIG. 1, in a radially inner region 130 by means of a disengagement mechanism 132, which is only diagrammatically depicted, so that the radially outer region 134 of the diaphragm spring 126 releases or no longer acts on a support region 136 of the pressure plate 124. The pressure plate 124 can then move to the right, i.e. away from the flywheel 112, in the illustration shown in FIG. 1, for example as a result of the action of force from tangential leaf springs or the like. Friction linings 142 of a clutch disk, which is generally denoted by 144, can be clamped between a friction-surface 138 of the pressure plate 124 and a corresponding friction-surface 140 of the flywheel 112. The clutch disk 144 furthermore comprises a torsional-vibration damper 146 which, in a manner known per se, provides rotary coupling of the friction linings 142 to a hub 148. The hub 148 is coupled in a rotationally fixed manner to an output shaft, for example a transmission input shaft 150, via toothing. A free end region of the transmission input shaft 150 may, via a bearing arrangement 152, be mounted rotatably in a recess in the crankshaft 114 and can thus be centered with respect to the crankshaft 114.

It is known that, when carrying out engagement and disengagement operations, relatively high temperatures arise in the region of the friction-surface 138, and likewise in the region of the friction-surface 140. These temperatures are generated by the slippage between the friction linings 142 and the pressure plate 124 or the flywheel 112 which is present when engagement and disengagement operations are being carried out. Particularly when using organic friction linings, there is a risk of carbonization or excessive wear to these friction linings being induced by excessive temperatures.

In order to counteract this risk, the present invention provides a special structure of the pressure plate 124.

A first embodiment of a pressure plate 124 of this nature is shown in FIG. 2. In this figure, it can be seen that the pressure plate 124 is essentially divided into two disk-like or annular regions. These are firstly a friction-surface region 154, which forms the friction-surface 138 and thus comes into contact with the friction linings or one of the friction linings 142. On the opposite side from the friction-surface 138, the friction-surface region 154 is joined to a body region 156, which also forms the support region 136 for the diaphragm spring 126 of FIG. 1.

In the pressure plate 124 according to the invention, there is provision for the friction-surface region 154 to be formed from a first material which ensures that the heat generated in the region of the friction-surface 138 is conducted away from this surface 138, and thus from the friction linings 142 which are in contact therewith, as quickly as possible. To this end, the first material is a material with a high thermal conductivity. For example, aluminum or copper or an alloy of at least one of these materials may be employed here.

The body region 156 is then constructed from a second material which has a high specific heat capacity, in order to be able to temporarily store the heat which has been conducted away or dissipated from the friction-surface region 154 initially when carrying out a clutch-actuating operation. During and after the end of such an operation, i.e. when no further thermal energy is conducted into the body region 156 via the friction-surface region 154, the body region 156 can emit the thermal energy, by radiating or carrying it away, over its relatively large surface, i.e. both radially outward and radially inward and toward the side which is opposite to the friction-surface 138. Materials such as for example gray cast iron or steel are particularly suitable for the body region 156. Furthermore, it can be seen from FIG. 2 that the body region 156 comprising the second material takes up a significantly greater part of the overall volume of the pressure plate 124 than the friction-surface region 154. This also contributes to ensuring that the heat is conducted or kept away from the friction-surface region 154 as efficiently as possible.

A further embodiment of a pressure plate according to the invention is shown in FIG. 3. Components which correspond to components described previously are denoted by the same reference numeral with the addition of a suffix "a".

In the embodiment shown in FIG. 3, the body region 156a is surrounded by the first material, i.e. the material of the friction-surface region 154a, on the side which faces toward the flywheel (not shown), on which side the friction-surface 138a is also formed, and radially outward, as well as on the side which is opposite to the friction-surface 138a. In this case, therefore, the second material is virtually completely encapsulated by the first material, leading to the following advantages; the heat which is generated in the region of the friction-surface 138a flows, as described above, directly into the second material of the body region 156a over a first path. Furthermore, however, some of the heat also flows radially outward through the first material of the friction-surface region onto the side which is opposite to the friction-surface 138a, where it can be dissipated directly outward. In order, in this area, to increase the size of the effective surface area still further, it is possible for one or more cooling ribs 158a to be provided, which ribs, in addition to increasing the size of the surface area, may also be configured in such a way that they assume the function of ventilator blades.

The heat which is temporarily stored in the second material of the body region 156a can then be dissipated outward with greater efficiency via the material of the friction-surface region 154a which surrounds or encapsulates the body region 156a, so that when no further thermal energy is introduced into the body region 156a, this region can be cooled more rapidly.

It is pointed out that in the embodiments described above, the joining zones between the individual materials are preferably to be formed by material-to-material contact over the entire surface, in order to avoid a build-up of heat in the region of the interfaces. By way of example, it is conceivable to produce a pressure plate as an aluminum/gray cast iron composite casting. Furthermore, in the embodiments described above and also in the following embodiment, the friction-surface may be formed by a coating or applied layer of material which has improved abrasion-resistance properties over the first material of the friction-surface region. This is advantageous in particular when the material of the friction-surface region is selected with a view to optimizing the thermal dissipation, and therefore may have an insufficient resistance to abrasion.

It can be seen in FIG. 3 that the body region 156a is encapsulated by the first material of the friction-surface region 154a. It would also be possible for a different material, i.e. a third material, to be used radially on the outside and on the side which is opposite to the friction-surface 138a, which third material could then be joined, for example radially on the outside, to the first material of the friction-surface region. For stability reasons, however, the embodiment which is illustrated is preferred. However, should the first material involve reaching a compromise with regard to thermal conductivity, on the one hand, and wear resistance, on the other hand, the third material, which is not exposed to any frictional wear, could, for example, be a material with a coefficient of thermal conductivity which is even better than that of the first material, possibly combined with a lower wear resistance.

FIG. 4 shows a further embodiment of a pressure plate according to the invention. Components whose structure and function correspond to those of components described above are denoted by the same reference numeral, with the addition of the suffix "b".

In the configuration shown in FIG. 4, the entire pressure plate 124b is essentially composed of the first material of the friction-surface region 154b and encapsulates the body region 156b radially on the outside by means of a wall region 164b and, on the side opposite to the friction-surface 138b, by means of a wall region 166b. The second material of the body region 156b, which is now completely encapsulated and is contained in a chamber 168b which is either continuous in the circumferential direction or is divided into a plurality of chamber sections, is in this embodiment preferably a material whose melting point lies in the range of temperatures which are to be expected when carrying out engagement and disengagement operations, or lies slightly below these temperatures. This means that if thermal energy is generated during an engagement operation or a disengagement operation, and if this energy is introduced into the body region 156b through the friction-surface region 154b, the body region is initially only heated up to the melting point of the second material, and further introduction of energy results in the second material melting, in which case the temperature then does not initially rise. Only when the second material in the body region 156b has completely melted will its temperature rise further. When, after the end of an engagement or disengagement operation, no further thermal energy is introduced into the body region 156b, or else the amount of thermal energy introduced is less than the amount of thermal energy emitted from the body region 156b, the latter begins to solidify again and, in the process, emits thermal energy via the first material which surrounds it.

In order, with a configuration of this nature, to take into account the change in volume which is to be expected when the second material of the body region 156b changes from the solid phase to the liquid phase, bellows-like or ribbed areas 160b and 162b are provided in the wall regions 164b and 166b, respectively, which bellows-like or ribbed regions 160b, 162b provide for elasticity in these wall regions and thus allow the volume in the chamber 168b in which the second material of the body region 156b is accommodated to increase or to be adapted to the volume of the molten second material. Alternatively, the chamber 168b may be only partially filled with the second material.

Recommended materials for the body region 156b are, for example, sodium, which has a melting point of 97.5° C., and tin, which has a melting point of 232° C. Alloys or other materials, such as for example salts, whose melting points lie in this temperature range may also be employed.

It is pointed out that in this embodiment too, the walls 164b and 166b, for example, may comprise a different material from that of the friction-surface region 154b, in order to facilitate the emission of heat from the body region 156b still further in these wall regions 164b and 166b.

The novel configuration of the pressure plate allows the avoidance of defects or incorrect functioning caused by excessive temperatures to be considerably improved while maintaining the same volume or the same mass.

By using suitable materials or suitable material combinations, it is possible, in a simple manner, to adapt the pressure plate to the circumstances which are actually to be expected in operation.

It should furthermore be noted that the flywheel 112 may also be constructed in the manner described above with reference to FIGS. 2 to 4 and in relation to the pressure plate.

The invention is not limited by the embodiments described above which are presented as examples only but can be modified in various ways within the scope of protection defined by the appended patent claims.

We claim:

1. A pressure plate for a friction clutch, comprising:
   a friction-surface region; and
   a body region that adjoins the friction-surface region, the pressure plate, in the friction-surface region, being at least partially formed from a first material which provides dissipation of heat generated by friction, and in the body region, the pressure plate is formed from a second material which has a heat absorption capacity for heat dissipated from the friction-surface region, the first material being aluminum and the second material being gray cast iron so that the pressure plate is an aluminum/gray cast iron composite, the first material being in direct contact with the second material.

2. A pressure plate as defined in claim 1, wherein the first material completely covers a portion of the friction-surface region of the pressure plate which is contactable with a friction-lining arrangement.

3. A pressure plate as defined in claim 1, wherein the first material comprises a material with a thermal conductivity λ.

4. A pressure plate as defined in claim 3, wherein the thermal conductivity λ of the first material is at least 50 W/m K.

5. A pressure plate as defined in claim 1, wherein the first material is one of aluminum, copper and alloys thereof.

6. A pressure plate as defined in claim 1, wherein the second material is a material with a specific heat capacity c.

7. A pressure plate as defined in claim 6, wherein the specific heat capacity c of the second material is at least 0.35 kJ/kg K.

8. A pressure plate as defined in claim 1, wherein a third material, which provides dissipation of heat which is stored in the second material, adjoins the body region at least one of on a side which is opposite to the friction-surface region, radially outside and radially inside.

9. A pressure plate as defined in claim 6, wherein the third material and the second material are identical to one another.

10. A pressure plate as defined in claim 9, wherein the region which adjoins the body region and is formed from the first or third material is an integral material region.

11. A pressure plate as defined in claim 1, and further comprising a cooling-rib arrangement provided on the pressure plate.

12. A pressure plate as defined in claim 11, wherein the cooling-rib arrangement is provided on the pressure plate in a region remote from the friction-surface region.

13. A pressure plate as defined in claim 1, wherein a wear-resistant material layer is provided on one surface of the friction-surface region.

14. A pressure plate as defined in claim 13, wherein the wear-resistant material is a friction lining.

15. A pressure plate for a friction clutch, comprising:
   a friction-surface region; and
   a body region that adjoins the friction-surface region, the pressure plate, in the friction-surface region, being at least partially formed from a first material which provides dissipation of heat generated by friction, and in the body region, the pressure plate is formed from a second material which has a heat absorption capacity for heat dissipated from the friction-surface region, the body region being substantially encapsulated by the first material so that the first and second materials are in direct contact.

16. A pressure plate as defined in claim 15, wherein the first material completely covers a portion of the friction-surface region of the pressure plate which is contactable with a friction-lining arrangement.

17. A pressure plate as defined in claim 15, wherein the first material comprises a material with a thermal conductivity λ.

18. A pressure plate as defined in claim 17, wherein the thermal conductivity λ of the first material is at least 50 W/m K.

19. A pressure plate as defined in claim 15, wherein the first material is one of aluminum, copper and alloys thereof.

20. A pressure plate as defined in claim 15, wherein the second material is a material with a specific heat capacity c.

21. A pressure plate as defined in claim 20, wherein the specific heat capacity c of the second material is at least 0.35 kJ/kg K.

22. A pressure plate as defined in claim 15, wherein the second material is one of gray cast iron and steel.

23. A pressure plate as defined in claim 15, wherein a third material, which provides dissipation of heat which is stored in the second material, adjoins the body region at least one of on a side which is opposite to the friction-surface region, radially outside and radially inside.

24. A pressure plate as defined in claim 23, wherein the third material and the second material are identical to one another.

25. A pressure plate as defined in claim 24, wherein the region which adjoins the body region and is formed from the first or third material is an integral material region.

26. A pressure plate as defined in claim 15, and further comprising a cooling-rib arrangement provided on the pressure plate.

27. A pressure plate as defined in claim 26, wherein the cooling-rib arrangement is provided on the pressure plate in a region remote from the friction-surface region.

28. A pressure plate as defined in claim 15, wherein a wear-resistant material layer is provided on one surface of the friction-surface region.

29. A pressure plate as defined in claim 28, wherein the wear-resistant material is a friction lining.

30. A pressure plate for a friction clutch, comprising:
   a friction-surface region; and
   a body region that adjoins the friction-surface region, the pressure plate, in the friction-surface region, being at least partially formed from a first material which provides dissipation of heat generated by friction, and in the body region, the pressure plate is formed from a second material which has a heat absorption capacity for heat dissipated from the friction-surface region, the second material being completely encapsulated by the first material so that the first and second materials are in direct contact.

31. A pressure plate as defined in claim 30, wherein the first material completely covers a portion of the friction-surface region of the pressure plate which is contactable with a friction-lining arrangement.

32. A pressure plate as defined in claim 30, wherein the first material comprises a material with a thermal conductivity $\lambda$.

33. A pressure plate as defined in claim 32, wherein the thermal conductivity $\lambda$ of the first material is at least 50 W/m K.

34. A pressure plate as defined in claim 30, wherein the first material is one of aluminum, copper and alloys thereof.

35. A pressure plate as defined in claim 30, wherein the second material is a material with a high specific heat capacity c.

36. A pressure plate as defined in claim 35, wherein the specific heat capacity c of the second material is at least 0.35 kJ/kg K.

37. A pressure plate as defined in claim 30, wherein the second material has a melting point that lies in a range of temperatures which occur when the pressure plate acts with friction on a friction-lining arrangement.

38. A pressure plate as defined in claim 37, wherein the melting point of the second material lies in a range of 80° C. to 250° C.

39. A pressure plate as defined in claim 37, wherein the second material is one of sodium, tin, tin alloys, and nonmetallic materials.

40. A pressure plate as defined in claim 39, wherein the second material is a salt.

41. A pressure plate as defined in claim 37, wherein the pressure plate includes a chamber in which the second material is provided so as to at least partially fill the chamber.

42. A pressure plate as defined in claim 41, wherein the chamber is essentially completely surrounded by the first material.

43. A pressure plate as defined in claim 41, wherein the chamber is configured to have a variable volume.

44. A pressure plate as defined in claim 30, wherein a third material, which provides dissipation of heat which is stored in the second material, adjoins the body region at least one of on a side which is opposite to the friction-surface region, radially outside and radially inside.

45. A pressure plate as defined in claim 30, and further comprising a cooling-rib arrangement provided on the pressure plate.

46. A pressure plate as defined in claim 45, wherein the cooling-rib arrangement is provided on the pressure plate in a region remote from the friction-surface region.

47. A pressure plate as defined in claim 30, wherein a wear-resistant material layer is provided on one surface of the friction-surface region.

48. A pressure plate as defined in claim 47, wherein the wear-resistant material is a friction lining.

* * * * *